United States Patent [19]

Britton et al.

[11] 3,855,488

[45] Dec. 17, 1974

[54] PUSH BUTTON PULSE SIGNAL GENERATOR

[75] Inventors: Leon R. Britton, Chicago; Frank S. Vojir, Berwyn; William W. Wright, Wheaton, all of Ill.

[73] Assignee: Guardian Electric Manufacturing Company, Chicago, Ill.

[22] Filed: Sept. 17, 1973

[21] Appl. No.: 398,065

Related U.S. Application Data

[63] Continuation of Ser. No. 240,161, March 31, 1972, abandoned, which is a continuation-in-part of Ser. No. 170,729, Aug. 11, 1971, Pat. No. 3,718,828.

[52] U.S. Cl. .................. 310/8.3, 310/8.5, 310/8.7, 310/9.1, 310/14, 310/15, 307/108, 336/134
[51] Int. Cl. ...................... H04r 17/00, H03k 3/00
[58] Field of Search ........... 310/8.3, 8.7, 12, 13, 14, 310/15, 69; 317/93, 95, 97; 307/108, 119; 336/134

[56] References Cited
UNITED STATES PATENTS

| | | | |
|---|---|---|---|
| 2,913,688 | 11/1959 | Slebodnik et al. | 336/134 X |
| 3,116,428 | 12/1963 | Blodgett et al. | 310/15 |
| 3,259,769 | 7/1966 | Stott | 310/14 |
| 3,398,302 | 8/1968 | Harnau et al. | 310/14 |
| 3,500,086 | 3/1970 | Baermann | 310/69 |
| 3,586,888 | 6/1971 | Dorfman | 310/8.3 |
| 3,693,033 | 9/1972 | Troesh | 310/14 |
| 3,739,204 | 6/1973 | Sugawara | 310/14 |

*Primary Examiner*—Mark O. Budd
*Attorney, Agent, or Firm*—Molinare, Allegretti, Newitt & Witcoff

[57] ABSTRACT

A push button signal generator includes a coil mounted in a cylindrical housing with a plunger positioned in the center of the coil. The plunger is held in a fixed position by a permanent magnet within the housing. A push button may be depressed to drive the plunger through the coil thereby generating a pulse signal in the coil when the coil is placed in a circuit. Alternatively, the plunger may be positioned against a piezoelectric crystal. Flexing of the crystal will provide an electric output signal.

2 Claims, 7 Drawing Figures

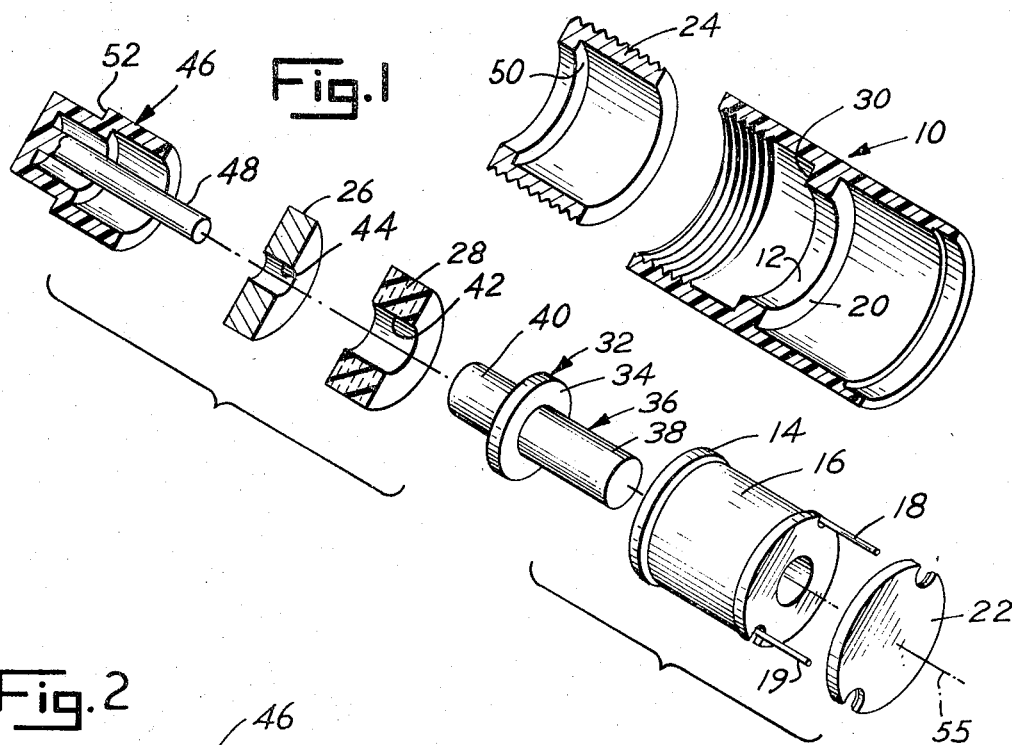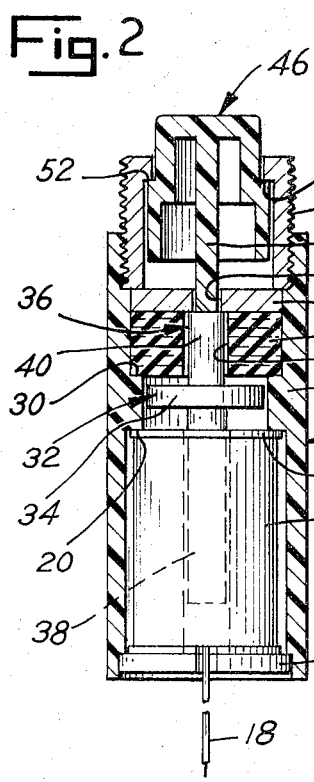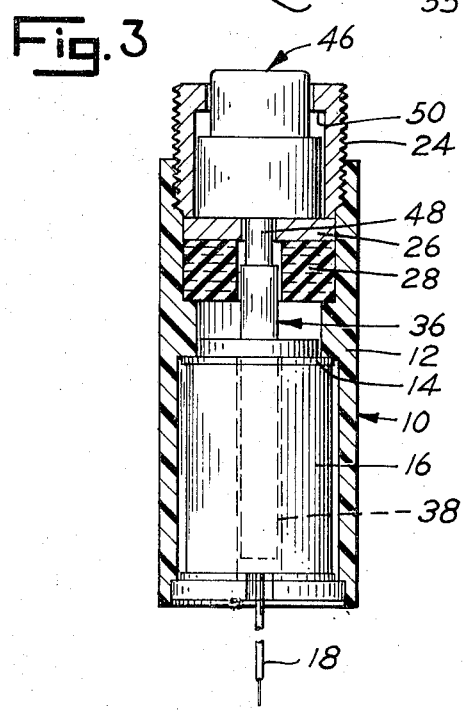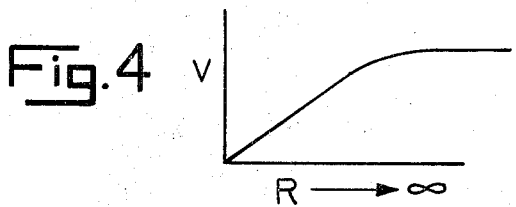

PUSH BUTTON PULSE SIGNAL GENERATOR

CROSS-REFERENCE TO RELATED APPLICATIONS

This is a continuation of application Ser. No. 240,161, filed Mar. 31, 1972 now abandoned, which is in turn a continuation-in-part of Ser. No. 170,729 filed Aug. 11, 1971 now U.S. Pat. No. 3,718,828.

BACKGROUND OF THE INVENTION

In a principal aspect, the present invention relates to a push button pulse signal generator especially useful for providing control signals in a circuit which includes the push button signal generator.

Control circuits are often low voltage circuits. Therefore, a signal generator which provides a low voltage output, particularly a pulse output, can be easily integrated as part of a control circuit. Among the desirable features of a signal generator for a control circuit are simplicity of construction, low cost, ease of repair and reliability. Also, it is desirable to have as few moving parts as possible. Finally, it is desirable to have a signal generator which is compact or small.

A typical prior art switch is shown by U.S. Pat. No. 3,559,788 issued Feb. 2, 1971 to Jensen et al. This patent discloses a switch which provides a signal by driving a permanent magnet through a coil. The magnet is driven by moving a spring biased lever arm. It is desirable to eliminate mechanical parts of such a switch. The present invention, for example, permits the elimination of the mechanical spring from such a switch.

SUMMARY OF THE INVENTION

Briefly, the present invention comprises an improved push button pulse signal generator wherein a coil or cyrstal, which is incorporated as part of the circuit, provides a pulse signal output whenever a plunger is driven through the coil or into the crystal by movement of a push button. The plunger is normally held in a fixed position by a permanent magnet. Depression of the push button overcomes the holding force of the permanent magnet on the plunger and permits the push button to drive the plunger thereby generating a pulse signal in the circuit.

It is thus an object of the present invention to provide an improved push button signal generator.

It is a further object of the present invention to provide an improved push button signal generator having no springs or contacts.

One further object of the present invention is to provide a push button signal generator having a single moving part in addition to the push button.

These and other objects, advantages and features of the invention will be set forth in greater detail in the description which follows.

BRIEF DESCRIPTION OF THE DRAWING

In the detailed description which follows, reference will be made to the drawing comprised of the following FIGURES:

FIG. 1 is an exploded perspective view of the improved push button signal generator of the present invention wherein certain components of the device are shown in cross section;

FIG. 2 is a cross-sectional elevation of the push button signal generator of the present invention shown in FIG. 1 wherein the push button is in a non-depressed position;

FIG. 3 is a cross-sectional view similar to FIG. 2 wherein the push button has been depressed;

FIG. 4 is a graph of typical voltage output of the signal generator versus the resistance of a circuit in which the signal generator of FIG. 1 is incorporated;

DESCRIPTION OF THE PREFERRED EMBODIMENTS

Figure 5:
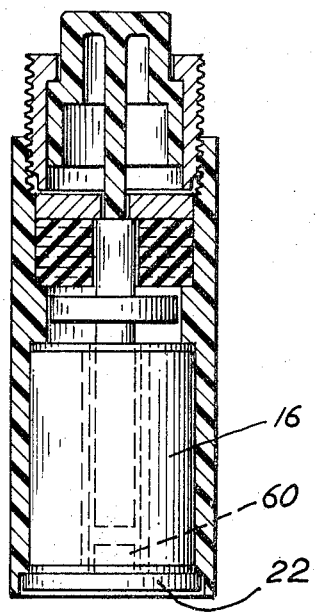
FIG. 5 is a cross-sectional view of a second embodiment of the invention.
Figure 6:
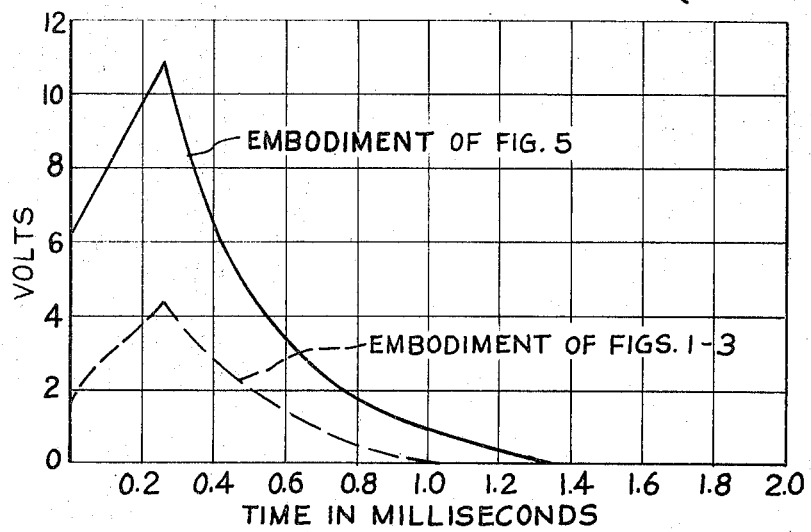
FIG. 6 is a graph of voltage output versus time for a signal generator of the type shown in FIG. 5.

In the description which follows, FIGS. 1 – 4 illustrate a first embodiment of the invention. FIGS. 5 and 6 illustrate a second embodiment and FIG. 7 a third embodiment.

Referring to FIGS. 1 – 3, the apparatus of the invention includes a cylindrically shaped housing 10 having an internal circumferential flange 12 as illustrated in FIG. 1. A wire coil 16 having leads 18 and 19 is wound on a bobbin 14. The bobbin 14 is positioned against a lower surface 20 of flange 12. The bobbin 14 is maintained within the housing 10 by means of an end cover or plate 22. Suitable openings in plate 22 permit the leads 18 and 19 therethrough.

An externally threaded sleeve 24 is threaded into the opposite end of the housing 10. Sleeve 24 maintains a metal keeper 26 and a permanent magnet 28 in fixed position against an upper surface 30 of flange 12. The keeper 26 and permanent magnet 28 are therefore in a substantially fixed position within the housing 10 and cooperate to maintain a plunger 32 within the housing 10.

The unitary plunger 32 includes a flange 34 and a rod 36. Rod 36 includes a lower portion 38 extending in one direction from the flange 34 along the longitudinal axis of the housing 10. An upper portion 40 of rod 36 extends in the opposite direction from flange 34. The lower portion 38 extends into the center of coil 16. The upper portion 40 extends through an annular opening 42 in the magnet 28 and is engaged by the keeper plate 26 when the device is in an unoperated position. The keeper plate 26 also includes an opening 44. However, the opening 44 has a smaller diameter than the diameter of the upper portion 40 in order to maintain the plunger 32 in position by means of the keeper plate 26.

A push button 46 includes a rod shaped extension 48 extending through the opening 44 and in contact with the upper portion 40 of the rod 36. Flange surface 50 of the sleeve 24 and flange surface 52 of push button 46 cooperate to maintain the push button 46 with the housing 10.

All of the components of the switch are cylindrically shaped and coaxial. Thus, the push button 46, keeper plate 26, magnet 28, plunger 32, coil 16, bobbin 14 and end plate 22 all have a common axis 55. The housing 10 and sleeve 24 have the same common axis. The button 46 and plunger 32 are translatable along the axis 55.

In operation, the plunger 32, which is fabricated from a material attracted to a magnet, is maintained in position by the magnetic force of the permanent magnet 28. In particular, the flange 34 is attracted by the magnet 28. Thus, the plunger 32 is maintained in the position shown in FIG. 2. This simultaneously maintains the push button 46 in the non-depressed position also shown in FIG. 2.

To activate the signal generator, the push button 46 is manually depressed to overcome the force of the magnetic attraction of the magnet 28 for the plunger 32. This drives the lower portion 38 of the plunger 32 through the coil 16, thereby generating a pulse signal in a circuit. FIG. 3 illustrates the device subsequent to depression of the push button 46.

Thus, the push button extension 48 impinges on the upper portion 40 of the plunger 32. When the manual force up on the push button 46 is sufficiently great, the plunger 32 breaks away from the keeper plate 26 quite suddenly, the lower portion 38 moving as suddenly through coil 16. This sudden breaking of the magnetic hold on plunger 32 and movement of the lower portion 38 in coil 16 causes a rapid change in the flux density in the coil 16. In turn, a voltage is induced in the coil 16 and a connected circuit. Removal of the force upon the button 46 allows the plunger 32 to return under the influence of the permanent magnet 28 causing a similar induced voltage, though of opposite polarity, in coil 16. The plunger 32 thus returns to the position determined by the keeper 26 and magnet 28.

The sudden breaking and remaking of the magnetic circuit between the keeper 26 and plunger 32 provides the "feel" of a detent and spring return. This feel as well as the output characteristics of the signal generator can be varied by changing the strength of the magnetic field, for example, (1) by using a magnet of different strength, or (2) by changing the gap between the flange 34 and the magnet, or (3) by changing the thickness of plating of the non-magnetic material on surface of the keeper plate or plunger, or (4) by changing the material and the gap between the flange 34 and the magnet 28. Additionally, the shape of the magnet 28, the shape of the plunger 32, or the construction of the coil winding 16, can be varied to achieve different characteristics of the signal.

FIG. 4 represents the typical variation in voltage with resistance of a signal generated by the generator of the present invention. The magnitude of the curve shown in FIG. 4 will vary as the physical parameters of the coil 16, etc., are varied. Nevertheless, FIG. 4 represents the relative change of voltage vs. change in load for the switch.

Note that since the induced voltage in a circuit including the coil 16 is a result in change of flux density in the coil winding, the return of the plunger 32 into contact with the keeper plate 26 will also result in another output pulse signal having opposite polarity from the pulse signal created during depression of the push button 46. This may or may not be desirable depending upon the design of the circuitry in which the device operates. However, by proper use of diode, the pulse signal of either polarity can be blocked.

Advantageously, the device has only one moving part, and it is not the type or part which is required to flex such as a spring. Thus, the device has an exceptionally long life and simultaneously maintains consistent signal generating characteristics.

A second embodiment of the invention is illustrated in the cross sectional view of FIG. 5. FIG. 6 is a graph which illustrates by a solid line the significant increase in the strength of a pulse signal output realized from the embodiment illustrated in FIG. 5 as compared with the output of the embodiment shown in FIGS. 1 – 3 which is represented by the dashed line.

The construction of the embodiment illustrated in FIG. 5 is quite like that shown in the previously discussed FIGS. 1 – 3, particularly FIG. 2. For this reason, the like portions of the structure illustrated in FIG. 5 is numbered as that of FIG. 2.

One significant difference between the structure of FIG. 5 and that of FIG. 2 is provided in the end plate 22. The embodiment of FIG. 2 utilizes an end plate 22 made from an insulating material. End plate 22 in FIG. 5 includes a projecting spike or stud 60. The spike or stud 60 extends at least partially into the coil 16. The spike 60 is preferably made from a magnetically conductive material such as iron which accentuates the conduction of magnetic flux lines associated with the coil. Preferably, the end plate 22 and spike 60 are integrally fabricated from the same material. As can be seen, this provides an improved path for the magnetic lines of force associated with the coil 16. Note also that the spike 60 substantially reduces the air gap between the plunger 38 and the end plate 22.

Alternatively, the plunger 38 can be elongated to extend through an opening in the end plate 22. This alternative arrangement is effective to increase output in the same manner as the embodiment utilizing the spike 60.

FIG. 6 illustrates a typical output of the pulse generator of the type shown in FIG. 5. As can be seen, the maximum voltage output of the pulse generator with a load of 15,000 ohms amounts to about 13 volts. This is to be compared with the output of a push button generator of the type shown in FIG. 2 under the same conditions of about 4 volts. Thus, it has been found when experimenting with the embodiment of the type shown in FIG. 5 that the voltage output is increased from 2½ to 3 times due to the addition of metallic end cover 22 with a spike or stud 60 which projects into the interior of the coil 16.

Figure 7:
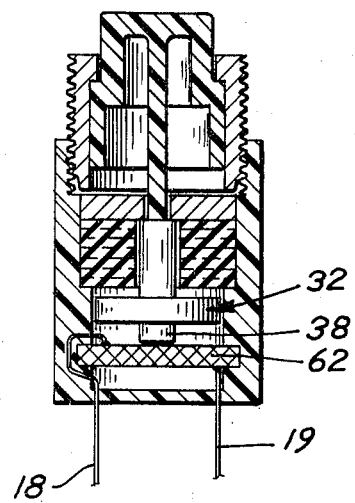
FIG. 7 is a cross-sectional view of a third embodiment of the invention which utilizes a piezoelectric crystal to generate a pulse.

Still another embodiment is illustrated in FIG. 7. In the embodiment of FIG. 7 as compared with the embodiment of FIGS. 2 and 5, the coil 16 has been replaced by a piezoelectric crystal 62. The crystal 62 is disc shaped and is positioned so that the end of plunger 32, which now has a shortened lower end 38, will mechanically directly impinge thereon and flex the crystal 62 whenever the push button 46 is depressed. Mechanical flexing of the crystal 62 induces an electrical pulse in the leads 18 and 19 which are attached to opposite sides of the crystal 62.

As in the embodiment of FIG. 2, the permanent magnet 28 and keeper 26 cooperate with the plunger 32 to provide a "feel" for the push button signal generator. The other comments set forth above in regard to the utility and various uses to which the signal generator of FIG. 2 can be put are also applicable to the embodiments illustrated by FIGS. 5 and 7.

It is to be understood that there has been described preferred embodiments of the present invention and that the scope of the invention is to be limited only by the following claims and their equivalents.

What is claimed is:

1. A push button signal generator comprising, in combination:

a housing having a longitudinal axis and having mounted therein the following:

a. a piezoelectric plate mounted in one end of said housing, said plate having signal leads;

b. A movable plunger of magnetic material including an extension at one end engageable with said plate, said plunger also including an intermediate flange portion and a projection at the other end;

c. A fixed magnet adjacent said flange portion for magnetically attracting said plunger in a first direction to a first position not engaging said plate;

d. a keeper plate for engaging said projection to limit the travel of said plunger in said first direction and prevent said flange from engaging said magnet; and e. push button means including an extension for engaging said plunger and driving said plunger in a direction opposite the first direction against the force of said magnet and into engagement with said plate to thereby generate an electrical signal across said leads, said magnet acting to return said plunger to said first position upon release of said push button means.

2. A push button signal generator comprising, in combination a housing having a longitudinal axis and having mounted therein the following:

a. a coil with a center opening substantially parallel to the longitudinal axis;

b. a movable plunger of magnetic material including a portion movable in the coil opening, a flange portion outside one end of the coil and a projection extending from said flange portion;

c. a fixed magnet adjacent said flange portion for magnetically attracting said flange portion in a first direction;

d. a keeper plate on said magnet for engaging said projection from said plunger to limit the travel of said plunger in said first direction;

e. push button means including means for engaging said plunger and driving said plunger from said keeper plate in a direction opposite the first direction; and f. magnetically conductive material positioned on the opposite end of said coil opposite said plunger and extending at least partially into said coil.

* * * * *